United States Patent
Katoh et al.

(10) Patent No.: US 7,643,317 B2
(45) Date of Patent: Jan. 5, 2010

(54) POWER CONVERTING DEVICE AND METHOD FOR CONTROLLING THE SAME

(75) Inventors: Shuji Katoh, Hitachiota (JP); Yasuhiro Kiyofuji, Hitachi (JP); Shoichiro Koseki, Mito (JP); Tomomichi Ito, Hitachi (JP); Motoo Futami, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 188 days.

(21) Appl. No.: 11/964,274

(22) Filed: Dec. 26, 2007

(65) Prior Publication Data

US 2009/0168474 A1 Jul. 2, 2009

(51) Int. Cl.
*H02M 1/15* (2006.01)
*H02M 3/155* (2006.01)

(52) U.S. Cl. .............................. 363/44; 363/76; 363/84
(58) Field of Classification Search .................. 363/44, 363/47, 76, 77, 81, 84, 125, 127
See application file for complete search history.

(56) References Cited

U.S. PATENT DOCUMENTS 4,941,079 A * 7/1990 Ooi ............................ 363/132
6,459,599 B1 * 10/2002 Agirman et al. ............... 363/84
7,499,291 B2 * 3/2009 Han ............................. 363/17

FOREIGN PATENT DOCUMENTS

JP 5-011870 1/1993

\* cited by examiner

*Primary Examiner*—Gary L Laxton
(74) *Attorney, Agent, or Firm*—Antonelli, Terry, Stout & Kraus, LLP.

(57) ABSTRACT

In a system to which a fluctuating load is connected, compensating for fluctuation in voltage harmonics at the load connecting point and fluctuation in system current harmonics has been difficult for a power converting device connected in parallel with the load. To resolve the problem, a power converting device connected in parallel with a fluctuating load includes: a Fourier series expansion unit which executes Fourier series expansion to load current by use of a reference sine wave in sync with a system and thereby outputs Fourier coefficients; and a fundamental component calculating unit which calculates a positive phase active fundamental component of the load current from the Fourier coefficients. A current instruction of the power converting device is generated by subtracting the fundamental current from the load current. With the current instruction, the fluctuations in system current harmonics and in voltage harmonics at the connecting point can be compensated for.

21 Claims, 7 Drawing Sheets

POWER CONVERTING DEVICE AND METHOD FOR CONTROLLING THE SAME

BACKGROUND OF THE INVENTION

The present invention relates to a power converting device which is connected to an AC (Alternating Current) system, and in particular, to a power converting device capable of suppressing voltage fluctuation caused by load fluctuation or suppressing fluctuation in system current.

When a load connected to a system fluctuates, the system current fluctuates and a voltage drop caused by power line impedance and transformer impedance also fluctuates due to the system current fluctuation, by which voltage fluctuation (flicker) occurs at a connecting point where the load is connected to the system.

A flicker suppressing device for suppressing the flicker has been proposed in JP-A-HEI 05-011870.

The above flicker suppressing device calculates active current and reactive current from load current by use of a high-pass filter and a low-pass filter, respectively. The flicker suppressing device suppresses a fluctuating part of current flowing from the system to the load by outputting current in the opposite phase to the detected load current, by which the flicker is suppressed.

In the above flicker suppressing device, only high-frequency fluctuation is extracted from active power, and the high-frequency fluctuation is compensated for by use of the active power. Therefore, the effect of the compensation is weak for harmonic components fluctuating in low frequencies, etc. Consequently, the effect of compensation for the system current fluctuation and the voltage fluctuation at the connecting point is also necessitated to be insufficient.

SUMMARY OF THE INVENTION

To resolve the above problems, a power converting device connected in parallel with a fluctuating load comprises: a Fourier series expansion unit which executes Fourier series expansion to load current by use of a reference sine wave in sync with a system and thereby outputs Fourier coefficients; and a fundamental component calculating unit which calculates a positive phase active fundamental component of the load current from the Fourier coefficients.

By obtaining the amplitude of the positive phase active fundamental current from the Fourier series, the current instruction value can be generated by, for example, removing the positive phase active fundamental current from the load current, by which the voltage fluctuation and the system current fluctuation caused by the fluctuation in the harmonic components can also be reduced.

BRIEF DESCRIPTION OF THE DRAWINGS

The objects and features of the present invention will become more apparent from the consideration of the following detailed description taken in conjunction with the accompanying drawings, in which.

DETAILED DESCRIPTION OF THE EMBODIMENTS

Figure 1:
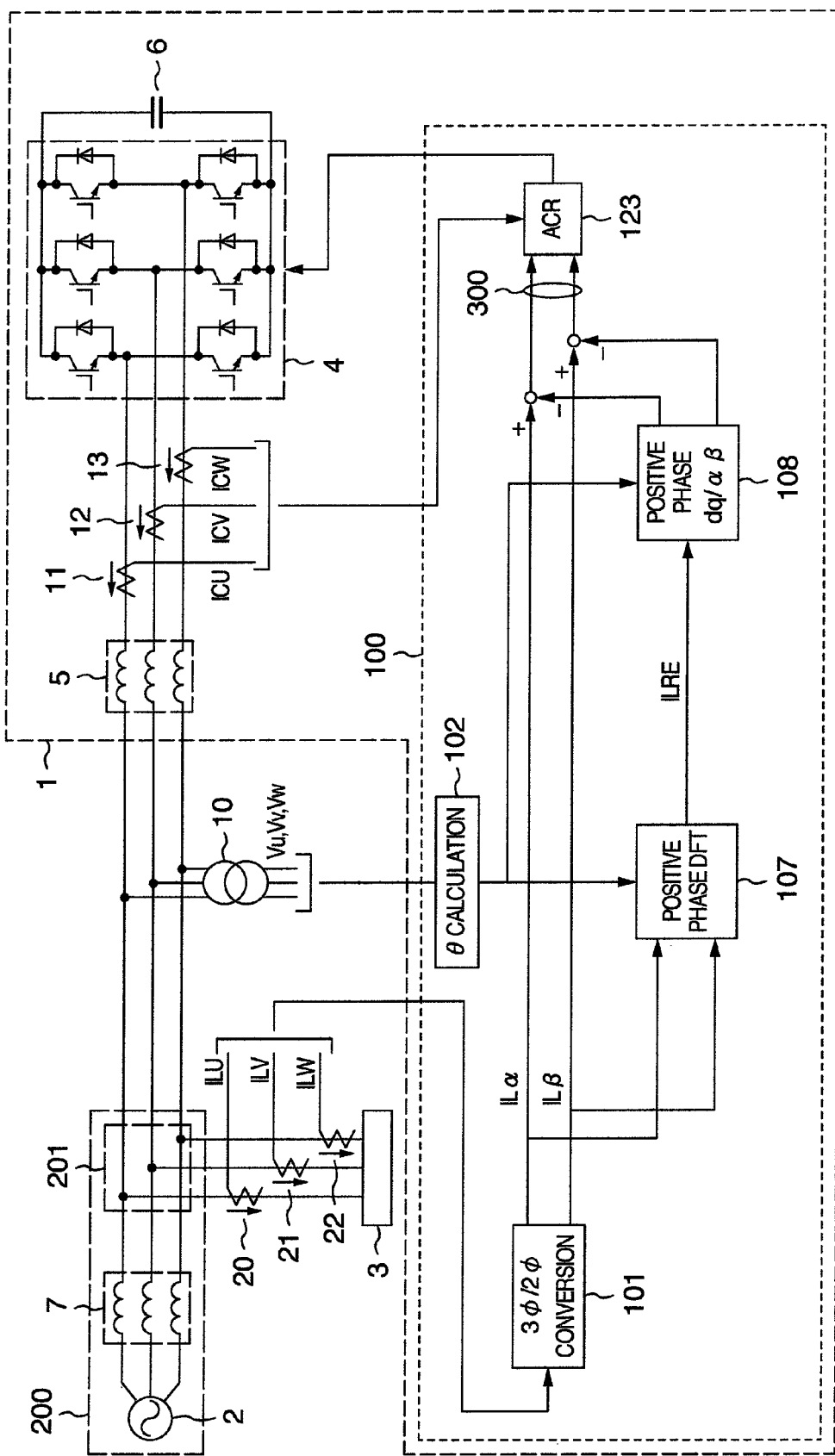
FIG. 1 is a schematic diagram showing a principal part of a power converting device in accordance with a first embodiment of the present invention.

Referring now to the drawings, a description will be given in detail of preferred embodiments in accordance with the present invention.

Embodiment 1

A first embodiment in accordance with the present invention will be described referring to FIG. 1.

As shown in FIG. 1, a power converting device 1 in accordance with the first embodiment is connected to a load 3 and an AC system 200 of a commercial power system at a connecting point 201. In FIG. 1, the AC system 200 is represented by an AC power supply 2 and a system impedance 7. The system impedance 7 means power line impedance and transformer impedance. When the load current fluctuates, the voltage drop occurring in the system impedance 7 also fluctuates, by which voltage fluctuation occurs at the connecting point 201 of the load 3 and the AC system 200. The power converting device 1 of this embodiment reduces and suppresses the voltage fluctuation at the connecting point and the system current fluctuation which are caused by the load current fluctuation.

The power converting device 1 of this embodiment includes a main circuit unit and a control calculation unit 100. The main circuit unit includes an electric power converter 4 (made up of IGBTs and diodes), a filter reactor 5 and a DC capacitor 6. AC output terminals of the electric power converter 4 are connected to the AC system 200 via the filter reactor 5. The DC capacitor 6 is connected to DC output terminals of the electric power converter 4 to be in parallel with the electric power converter 4. Incidentally, the filter reactor 5, which is just required to have impedance, may also be implemented by a transformer.

Meanwhile, the control calculation unit of the power converting device 1 is shown in FIG. 1 with the reference numeral "100". While the power converting device 1 actually executes various other processes (e.g. control to keep the voltage of the DC capacitor 6 at a constant level), control blocks not directly relevant to the principal part of the present invention are omitted in FIG. 1. In fact, a current instruction value of the power converting device 1 means the sum of the current instruction value 300 shown in FIG. 1 and the output of the capacitor constant-voltage control. While the electric power converter 4 is controlled by means of PWM (Pulse Width Modulation) according to instructions from a current controller 123, the explanation of the PWM control is omitted here.

The power converting device 1 detects the load current (three-phase load currents ILU, ILV and ILW) by use of current sensors 20-22 and calculates the current instruction value 300 (for suppressing the system current fluctuation) from the detected values of the load current (hereinafter referred to simply as "load current detected values"). In this embodiment, an active current fundamental component is calculated from the load current detected values, and a current output instruction of the power converting device 1 is obtained by subtracting the active current fundamental component from the load current.

Specifically, the load current detected values are converted by a three-phase/two-phase conversion block 101 into two-phase currents ILα and ILβ. Subsequently, a voltage phase is calculated by a θ calculation block 102 based on voltages detected at the connecting point 201, and an active current component ILRE is calculated by a positive phase DFT calculator 107 by executing positive phase DFT (Discrete Fourier Transform) based on the phase information outputted by the θ calculation block 102. Specifically, the positive phase DFT calculator 107 calculates positive phase real axis fundamental component amplitude IL1RE and positive phase imaginary axis fundamental component amplitude IL1IM of the load current according to the following expressions (1). In the expressions (1), "θ" represents the phase θ when the fundamental components of the voltages at the detecting point (U-phase voltage Vu, V-phase voltage Vv and W-phase voltage Vw at the connecting point 201) are expressed as Vu=cos(θ), Vv=cos(θ−2π/3) and Vw=cos(θ−4π/3).

$$\begin{cases} IL1\mathrm{RE} = 2f_s \left\{ \int_{t-T}^{t} (IL\alpha \times \cos\theta) \, dt + \int_{t-T}^{t} (IL\beta \times \sin\theta) \, dt \right\} \\ IL1\mathrm{IM} = 2f_s \left\{ -\int_{t-T}^{t} (IL\alpha \times \cos\theta) \, dt + \int_{t-T}^{t} (IL\beta \times \cos\theta) \, dt \right\} \end{cases} \quad (1)$$

where "t" denotes the present time, "$f_s$" denotes the system frequency (frequency of the system in the connected state), and T=1/$f_s$.

Since the product of the load current (ILα, ILβ) and a sinusoidal wave in sync with the system voltage is integrated for one period as shown in the expressions (1), the gain becomes zero for load current components corresponding to integral multiples of the system frequency (i.e. for harmonic components), and thus the positive phase real axis fundamental component amplitude IL1RE of the load current equals positive phase active current fundamental component amplitude. The positive phase active fundamental component amplitude IL1RE of the load current obtained as above is reconverted by a positive phase dq/αβ converter 108 into AC components, and the obtained AC components are subtracted from the load current detected values (specifically, subtracted from the load current detected values converted into the two-phase currents ILα and ILβ in FIG. 1), by which the current instruction value 300 of the power converting device 1 is generated. Since the power converting device 1 operates so as to compensate only for current that is obtained by subtracting just the positive phase active current fundamental component from the load current, current components compensating for low-frequency fluctuation components of the harmonic current are also included in the current instruction value 300, by which low-frequency fluctuation components in the system current harmonics of the AC system 200 and the low-frequency fluctuation in the harmonic voltage at the connecting point 201 can also be compensated for.

Embodiment 2

While the current instruction value 300 of the power converting device 1 is calculated in the first embodiment by subtracting the positive phase active fundamental current from the load current, the current instruction value 300 of a power converting device 1 of a second embodiment is calculated by subtracting not only the positive phase active fundamental current but also low-frequency components (frequency components sufficiently lower than the fundamental frequency) of the positive phase reactive current amplitude from the load current.

For example, in cases where fluctuation compensation in a relatively high-frequency range (over several Hz) is important, the output of the power converting device 1 against high-frequency fluctuations can be relatively increased by reducing the compensation for low-frequency components (e.g. under 1 Hz) of the reactive current amplitude.

Figure 2:
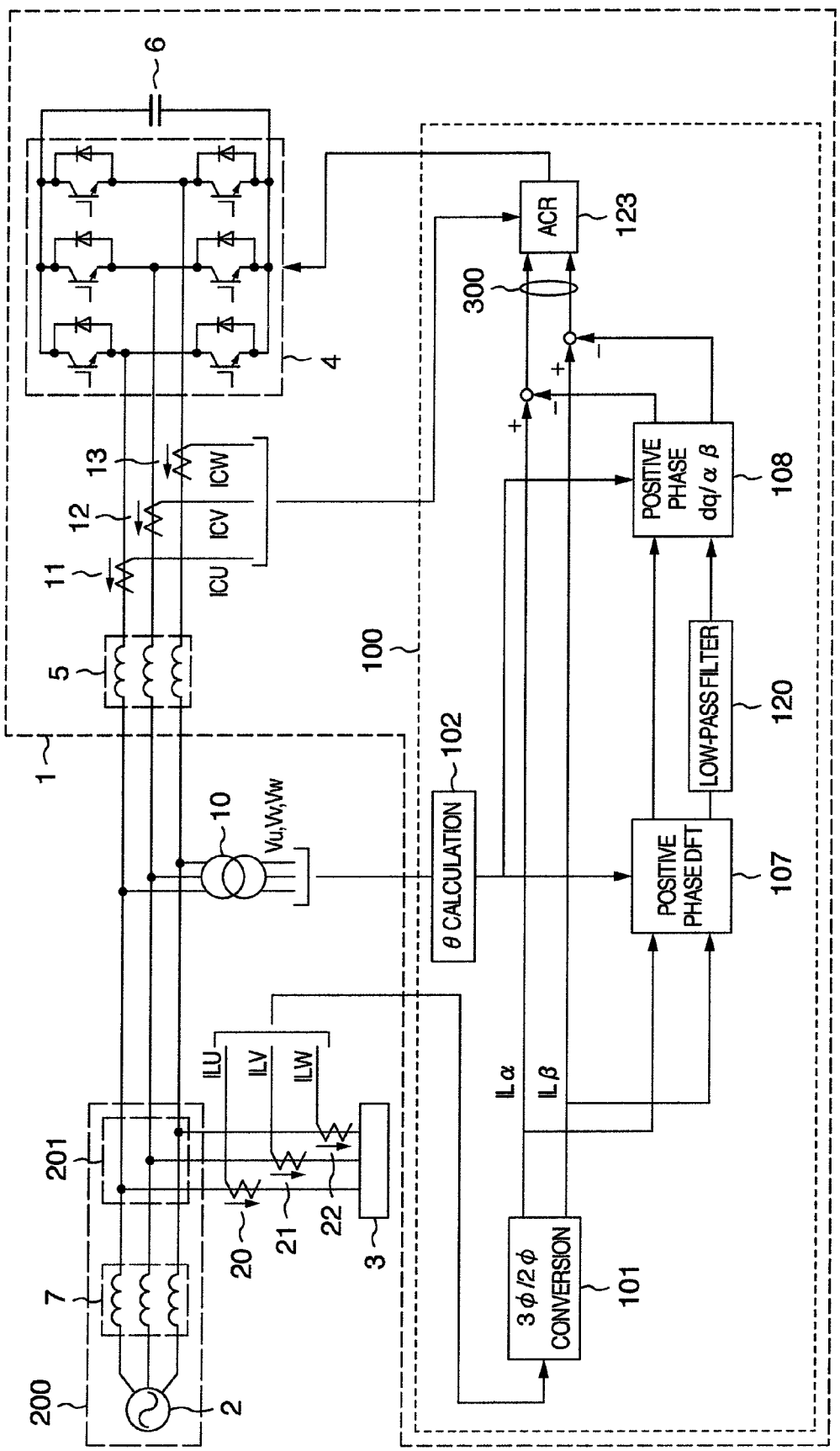
FIG. 2 is a schematic diagram showing a principal part of a power converting device in accordance with a second embodiment of the present invention.

FIG. 2 is a schematic diagram showing a principal part of the power converting device 1 in accordance with the second embodiment. While the power converting device 1 of the second embodiment actually executes various other processes (e.g. control to keep the voltage of the DC capacitor 6 at a constant level), control blocks not directly relevant to the principal part of the present invention are omitted in FIG. 2.

While only the positive phase active fundamental current amplitude (i.e. the positive phase active current fundamental component amplitude, that is, the positive phase real axis fundamental component amplitude IL1RE) is calculated from the load current (ILα, ILβ) in the first embodiment, the positive phase DFT calculator 107 in the second embodiment outputs both the positive phase real axis fundamental component amplitude IL1RE (i.e. the positive phase active fundamental current amplitude) and the positive phase imaginary axis fundamental component amplitude IL1IM (i.e. positive phase reactive fundamental current amplitude) of the load current by executing calculations according to the aforementioned expressions (1).

Subsequently, high-frequency components (e.g. over several Hz) are removed from the positive phase reactive fundamental current amplitude by a low-pass filter 120. The positive phase reactive fundamental current amplitude after the removal of the high-frequency components and the positive phase active fundamental current amplitude (i.e. the aforementioned positive phase active current fundamental component amplitude) are reconverted into to AC components by the positive phase dq/αβ converter 108. The current instruction value 300 of the power converting device 1 is obtained by subtracting the AC components from the load current (ILα, ILβ).

Since only the high-frequency components (over several Hz) are compensated only for in regard to the positive phase reactive fundamental current, more high-frequency fluctuation components (over several Hz) in the positive phase reactive current fundamental component can be compensated for even when the capacity of the power converting device 1 is low.

Embodiment 3

While the current instruction value 300 of the power converting device 1 is obtained by subtracting the positive phase active fundamental current and the low-frequency components of the positive phase reactive fundamental current from the load current (ILα, ILβ) in the second embodiment, the current instruction value 300 of a power converting device 1 in accordance with a third embodiment is calculated by subtracting not only the positive phase active fundamental current and the low-frequency components of the positive phase reactive fundamental current but also low-frequency components of negative phase currents from the load current (ILα, ILβ).

In cases where the load 3 is an imbalanced load and fluctuation compensation to relatively high-frequency components (over several Hz) is important, the output of the power converting device 1 against high-frequency fluctuations can be relatively increased by reducing the compensation to negative phase low-frequency components.

Figure 3:
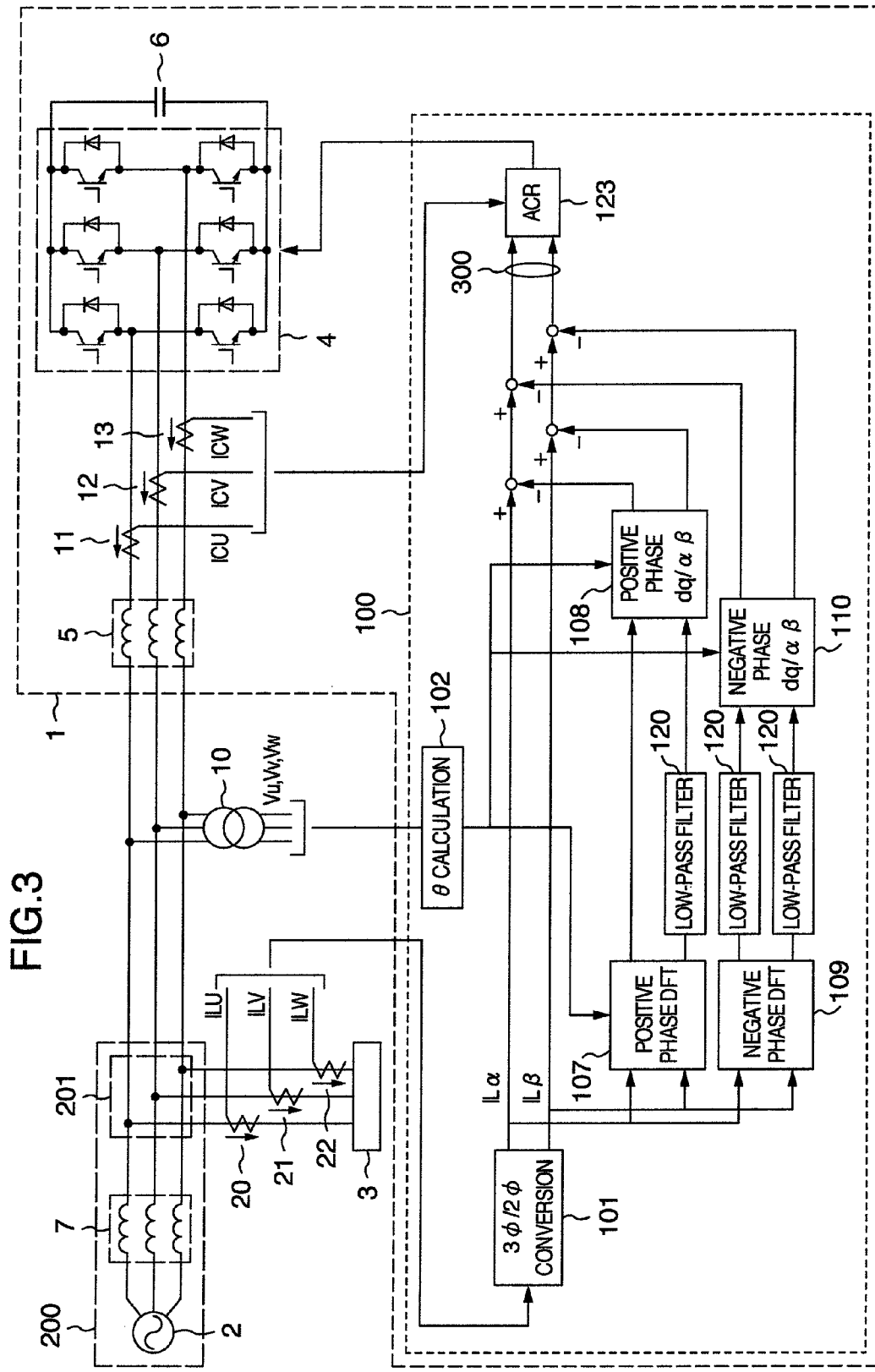
FIG. 3 is a schematic diagram showing a principal part of a power converting device in accordance with a third embodiment of the present invention.

FIG. 3 is a schematic diagram showing a principal part of the power converting device 1 in accordance with the third embodiment. While the power converting device 1 of the third embodiment actually executes various other processes (e.g. control to keep the voltage of the DC capacitor 6 at a constant level), control blocks not directly relevant to the principal part of the present invention are omitted in FIG. 3.

While the positive phase active fundamental current amplitude and the positive phase reactive fundamental current amplitude are calculated from the load current (ILα, ILβ) by the positive phase DFT calculator 107 in the second embodiment, the current instruction value 300 of the power converting device 1 in the third embodiment is calculated by obtaining negative phase real axis fundamental component amplitude IL2RE and negative phase imaginary axis fundamental component amplitude IL2IM by a negative phase DFT calculator 109, extracting low-frequency components from the amplitudes IL2RE and IL2IM by low-pass filters 120, reconverting the extracted low-frequency components into AC components by a negative phase dq/αβ converter 110, and subtracting the obtained AC components and the AC components outputted by the positive phase dq/αβ converter 108 from the load current (ILα, ILβ).

Since only the high-frequency components (over several Hz) are compensated for in regard to the positive phase reactive fundamental current amplitude IL1IM and the negative phase fundamental component amplitudes IL2RE and IL2IM, more high-frequency fluctuation components (over several Hz) in the positive phase imaginary axis component and in the negative phase components can be compensated for even when the capacity of the power converting device 1 is low.

Incidentally, the negative phase DFT calculator 109 calculates the negative phase real axis fundamental component amplitude IL2RE and the negative phase imaginary axis fundamental component amplitude IL2IM of the load current according to the following expressions (2).

$$\begin{cases} IL2RE = 2f_s\left\{\int_{t-T}^{t}(IL\alpha \times \cos\theta)dt - \int_{t-T}^{t}(IL\beta \times \sin\theta)dt\right\} \\ IL2IM = 2f_s\left\{\int_{t-T}^{t}(IL\alpha \times \cos\theta)dt + \int_{t-T}^{t}(IL\beta \times \cos\theta)dt\right\} \end{cases} \quad (2)$$

where "t" denotes the present time, "$f_s$" denotes the system frequency (frequency of the system in the connected state), and $T=1/f_s$.

Embodiment 4

Figure 4:
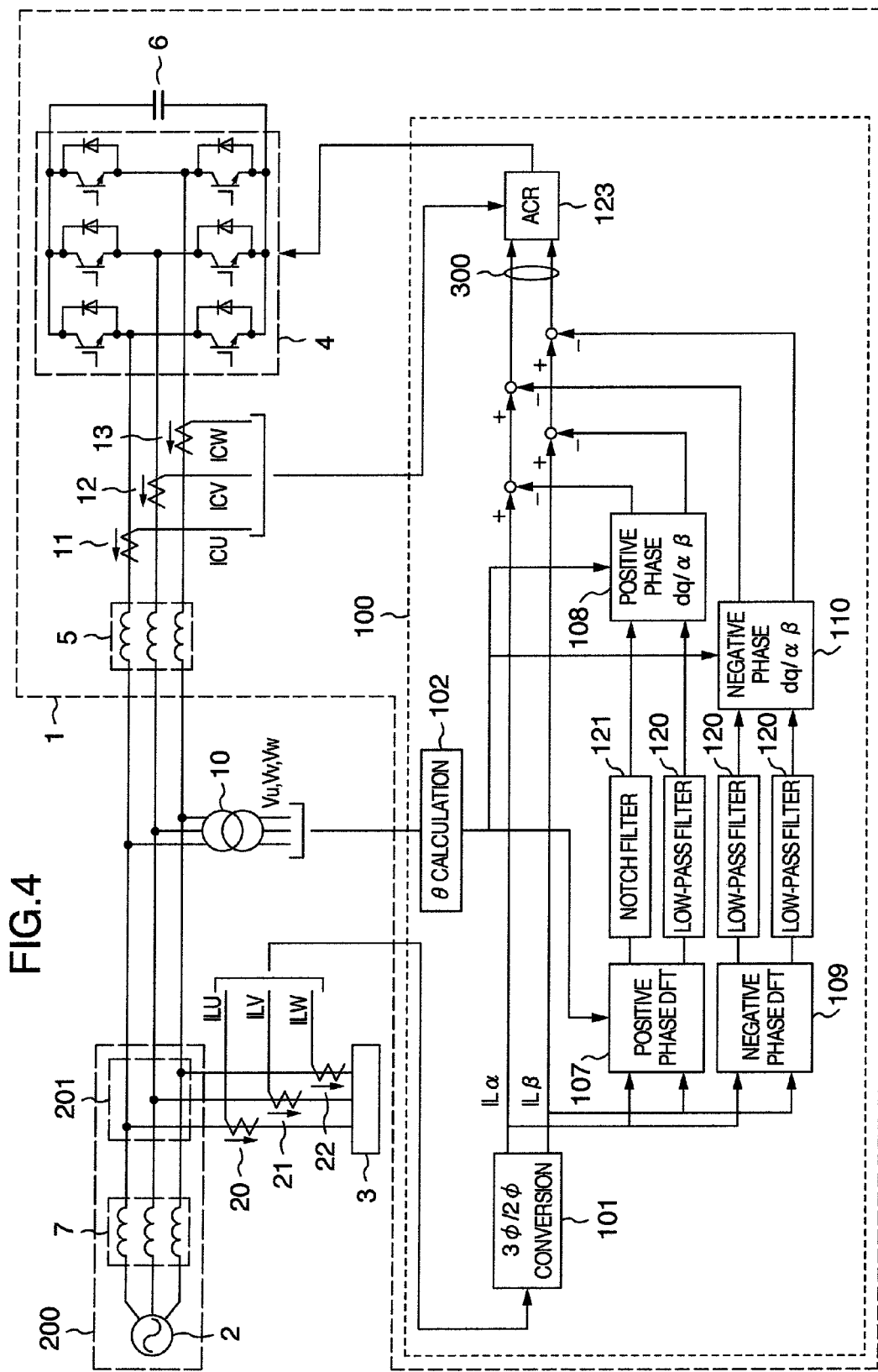
FIG. 4 is a schematic diagram showing a principal part of a power converting device in accordance with a fourth embodiment of the present invention.

FIG. 4 is a schematic diagram showing a principal part of a power converting device 1 in accordance with a fourth embodiment of the present invention. While the power converting device 1 of the fourth embodiment actually executes various other processes (e.g. control to keep the voltage of the DC capacitor 6 at a constant level), control blocks not directly relevant to the principal part of the present invention are omitted in FIG. 4.

In the fourth embodiment, a notch filter 121 whose center frequency is a multiple of the frequency of the system AC power supply 2 is connected to the positive phase active current fundamental component amplitude. When the negative phase fundamental component fluctuates, vibration at a frequency as a multiple of that of the system AC power supply 2 is caused to the positive phase real axis fundamental component amplitude. Thus, in order to prevent the interference by the fluctuation in the negative phase fundamental component, frequency components around the multiple of the frequency of the system AC power supply 2 are removed by the notch filter 121. Subsequently, the outputs of the notch filter 121 are converted into AC components by the positive phase dq/αβ converter 108. The current instruction value 300 of the power converting device 1 is generated by subtracting the outputs of the positive phase dq/αβ converter 108 and the negative phase dq/αβ converter 110 from the load current (ILα, ILβ). Due to prevention of such undesired interference from the negative phase component, the current control by the power converting device 1 can be carried out with high reliability.

Embodiment 5

Figure 5:
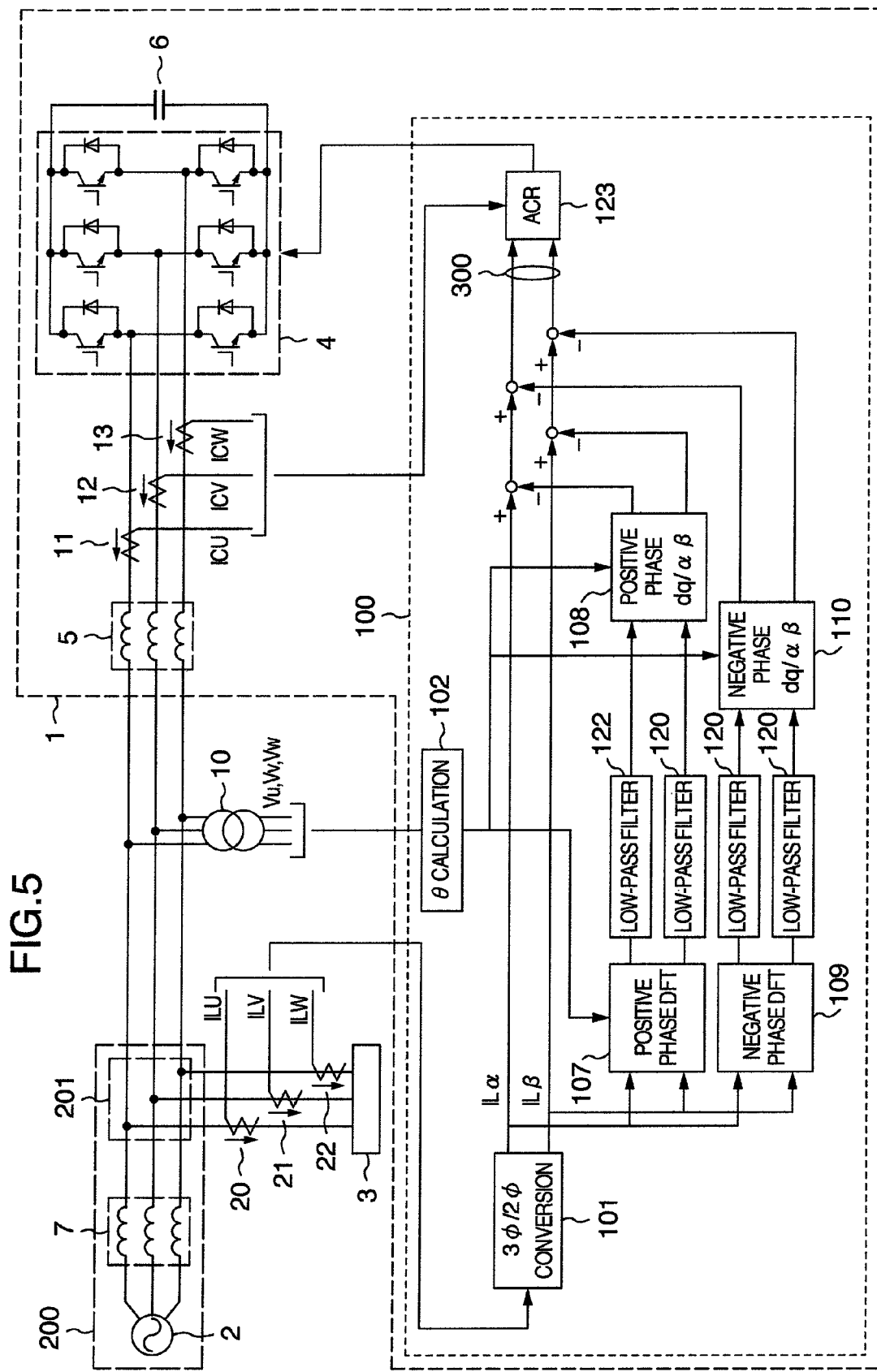
FIG. 5 is a schematic diagram showing a principal part of a power converting device in accordance with a fifth embodiment of the present invention.

FIG. 5 is a schematic diagram showing a principal part of a power converting device 1 in accordance with a fifth embodiment of the present invention. While the power converting device 1 of the fifth embodiment actually executes various other processes (e.g. control to keep the voltage of the DC capacitor 6 at a constant level), control blocks not directly relevant to the principal part of the present invention are omitted in FIG. 5.

In the fifth embodiment, a low-pass filter 122 is connected to the positive phase active current fundamental component amplitude. When the negative phase fundamental component fluctuates, vibration at a frequency as a multiple of that of the system AC power supply 2 is caused to the positive phase real axis fundamental component amplitude. In order to prevent the interference by the fluctuation in the negative phase fundamental component, frequency components around the multiple of the frequency of the system AC power supply 2 are removed by the low-pass filter 122. Subsequently, the outputs of the low-pass filter 122 are converted into AC components by the positive phase dq/αβ converter 108. The current instruction value 300 of the power converting device 1 is generated by subtracting the outputs of the positive phase dq/αβ converter 108 and the negative phase dq/αβ converter 110 from the load current (ILα, ILβ). The cut-off frequency of the low-pass filter is desired to be set at approximately 30 Hz, for example. Due to the prevention of the interference from the negative phase component, the current control by the power converting device 1 can be carried out with high reliability.

Embodiment 6

Figure 6:
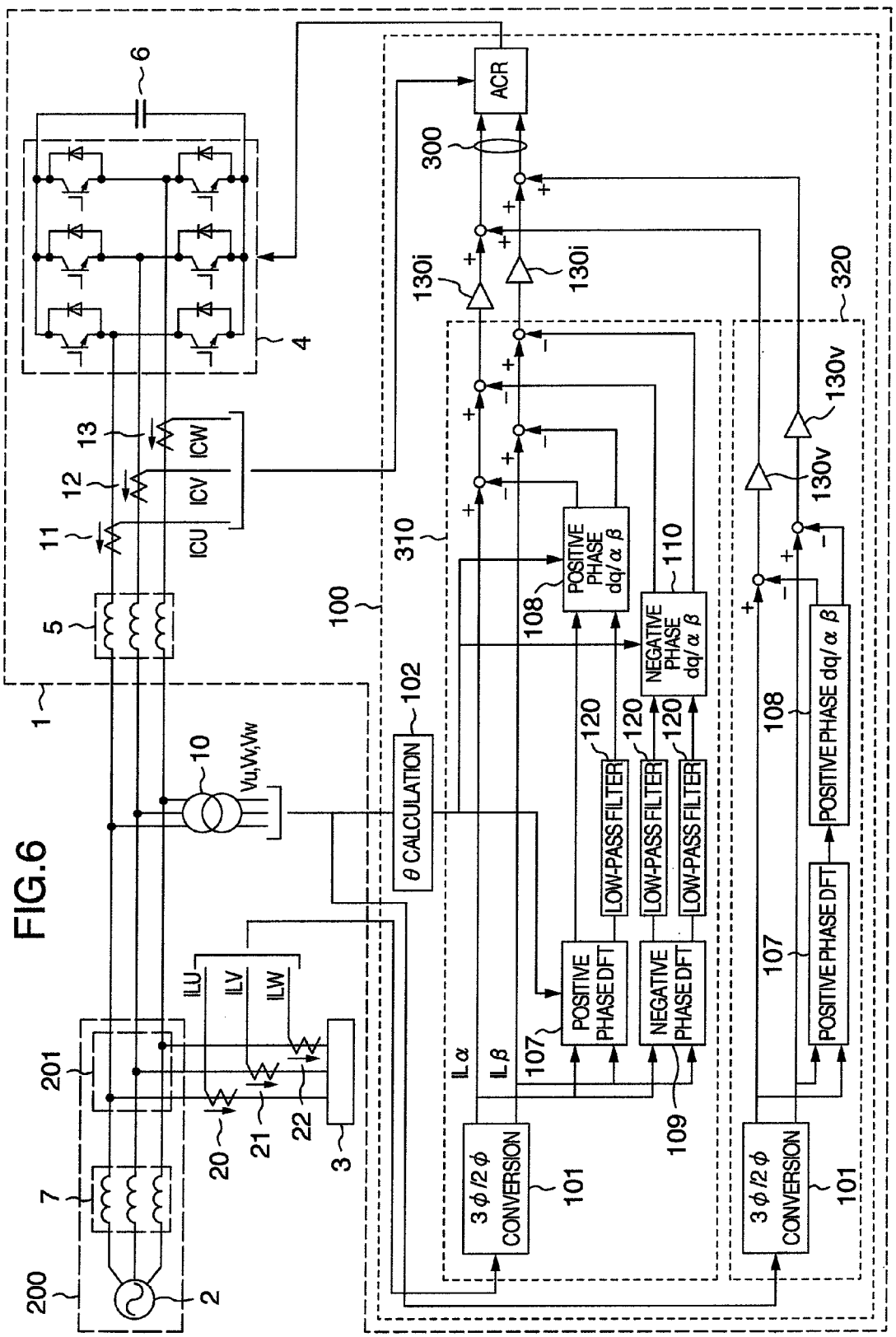
FIG. 6 is a schematic diagram showing a principal part of a power converting device in accordance with a sixth embodiment of the present invention.

FIG. 6 is a schematic diagram showing a principal part of a power converting device 1 in accordance with a sixth embodiment of the present invention. While the power converting device 1 of the sixth embodiment actually executes various other processes (e.g. control to keep the voltage of the DC capacitor 6 at a constant level), control blocks not directly relevant to the principal part of the present invention are omitted in FIG. 6.

In the sixth embodiment, a voltage compensation calculation block 320 is added to the power converting device 1 described in any of the first through fifth embodiments (third embodiment in the example of FIG. 6). In the voltage compensation calculation block 320, the voltages (Vu, Vv, Vw) at the connecting point 201 are converted by the three-phase/two-phase conversion block 101 (of the voltage compensation calculation block 320, ditto for the following components) into two-phase voltages, and positive phase active fundamental voltage amplitude is calculated from the two-phase voltages by the positive phase DFT calculator 107. The positive phase active fundamental voltage amplitude is reconverted into AC components by the positive phase dq/αβ converter 108, and the AC components are multiplied by a gain factor (real number) by gain multipliers 130$v$. Meanwhile, the current instruction value determined by a current compensation calculation block 310 (i.e. the control calculation unit 100 (except the current controller 123) described in any of the above embodiments) is multiplied by a gain factor ($\leqq 1$ in principle, can be 0) by gain multipliers 130$i$. The current instruction value 300 of the power converting device 1 in this embodiment is generated by adding the output of the voltage compensation calculation block 320 to the output of the gain multipliers 130$i$. Incidentally, the gain factor of the gain multiplier 130$v$ is set by multiplying a gain determining the degree of contribution of the voltage compensation ($\leqq 1$ in principle, can be 0) by the inverse (conversion into current) of the impedance of the filter reactor 5. By the addition of the voltage compensation calculation block 320 to the power converting device 1, voltage fluctuation at the connecting point 201 and system current fluctuation caused by factors other than the load 3 can be suppressed.

Incidentally, band-pass filters or low-pass filters (attenuating frequency components around a multiple of the system frequency) may be applied to the outputs of the positive phase DFT calculator 107 of the voltage compensation calculation block 320.

Further, similarly to the current compensation calculation block 310, the voltage compensation calculation block 320 may be configured to also calculate both positive phase reactive fundamental voltage with using the positive phase DFT 107 amplitude and negative phase fundamental voltage amplitudes with using the negative phase DFT calculator 109, to extract low-frequency components from the amplitudes, and subtract the extracted components from the positive phase fundamental voltage amplitude value.

Embodiment 7

Figure 7:
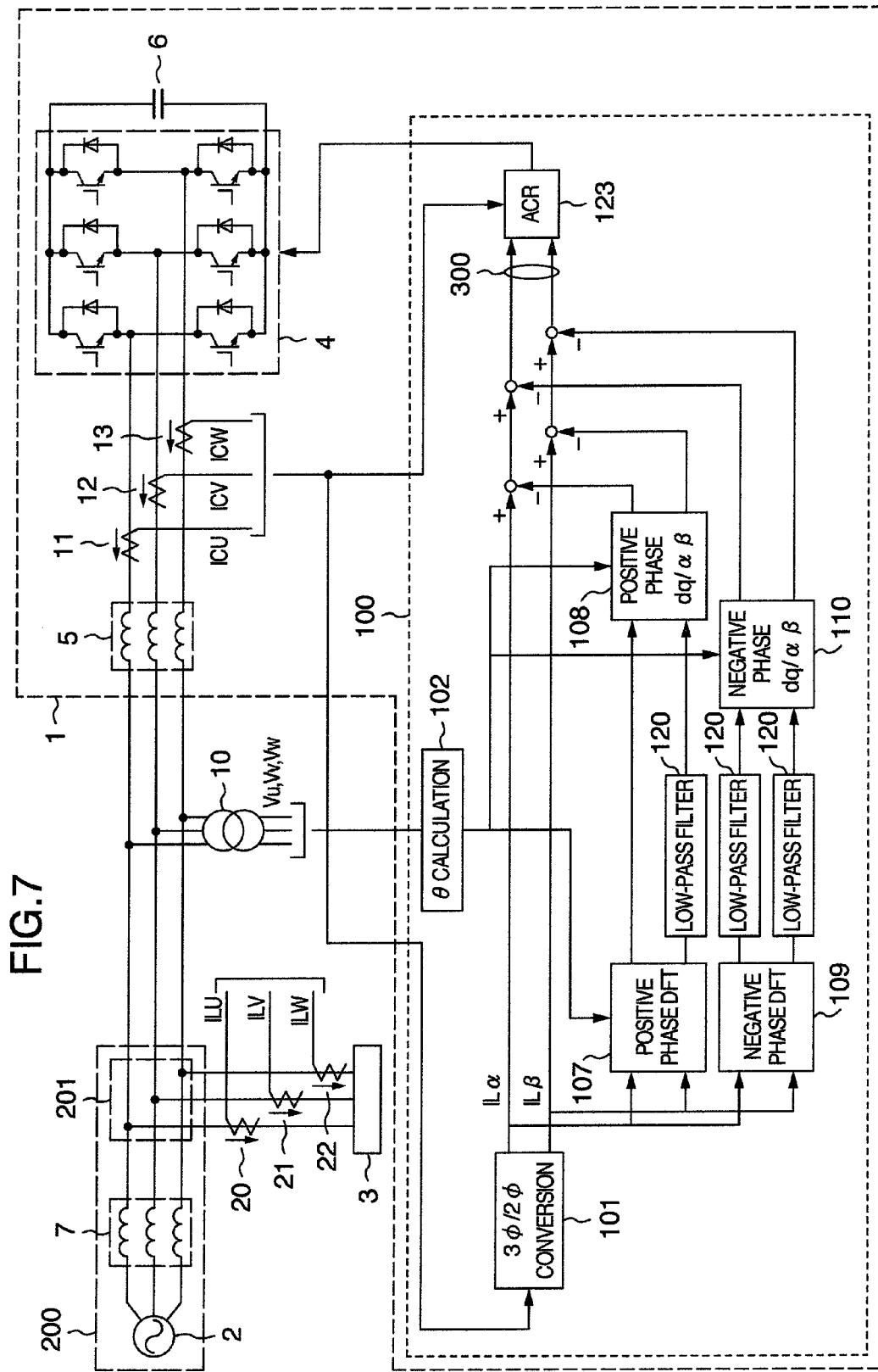
FIG. 7 is a schematic diagram showing a principal part of a power converting device in accordance with a seventh embodiment of the present invention.

FIG. 7 is a schematic diagram showing a principal part of a power converting device 1 in accordance with a seventh embodiment of the present invention.

While the power converting devices 1 in the above embodiments are designed to detect the load current and generate the current instruction value 300 from the detected load current, a power converting device 1 in accordance with a seventh embodiment detects the system current. By generating the current instruction value 300 from the system current, voltage fluctuation at the connecting point 201 and system current fluctuation caused by factors other than the load 3 can be suppressed.

As described above, by the power converting devices 1 in accordance with the above embodiments, the system current fluctuation and the voltage fluctuation at the connecting point can be suppressed, which contributes to the improvement of the quality of electric power.

While a description has been given above of preferred embodiments in accordance with the present invention, the present invention is not to be restricted by the particular illustrative embodiments and a variety of modifications, design changes, etc. are possible without departing from the scope and spirit of the present invention described in the appended claims.

The invention claimed is:

1. A power converting device which is connected in parallel with a fluctuating load, comprising:
    a current detecting unit which detects load current;
    a Fourier series expansion unit which executes Fourier series expansion to the detected load current;
    a positive phase active fundamental current calculating unit which calculates a positive phase active fundamental current based on the output of the Fourier series expansion unit; and
    a current instruction value calculating unit (100) which calculates a current instruction value of the power converting device by calculating a current compensation instruction value by subtracting current obtained using at least the positive phase active fundamental current from the load current and setting the current instruction value at the current compensation instruction value or at the sum of the current compensation instruction value and a current instruction value obtained by one or more other control units.

2. The power converting device according to claim 1, further comprising a positive phase reactive fundamental current calculating unit which calculates a positive phase reactive fundamental current based on the output of the Fourier series expansion unit, wherein:
    the current instruction value calculating unit calculates the current compensation instruction value by subtracting the positive phase active fundamental current and low-frequency fluctuation components of the positive phase reactive fundamental current from the load current.

3. The power converting device according to claim 1, further comprising:
    a positive phase reactive fundamental current calculating unit which calculates a positive phase reactive fundamental current based on the output of the Fourier series expansion unit;
    a negative phase Fourier series expansion unit which executes Fourier series expansion to a negative phase component of the detected load current;
    a negative phase real axis fundamental current calculating unit which calculates a negative phase real axis fundamental current based on the output of the negative phase Fourier series expansion unit; and
    a negative phase imaginary axis fundamental current calculating unit which calculates a negative phase imaginary axis fundamental current based on the output of the negative phase Fourier series expansion unit, wherein:
    the current instruction value calculating unit calculates the current compensation instruction value by subtracting the positive phase active fundamental current and low-frequency fluctuation components of the positive phase reactive fundamental current, the negative phase real axis fundamental current and the negative phase imaginary axis fundamental current from the load current.

4. The power converting device according to claim 1, further comprising a multiple frequency component removing unit which removes frequency components around a multiple of a system frequency from the positive phase active fundamental current, wherein:

the current instruction value calculating unit calculates the current compensation instruction value by subtracting the positive phase active fundamental current after the removal by the multiple frequency component removing unit from the load current.

5. The power converting device according to claim 1, further comprising a positive phase reactive fundamental current calculating unit which calculates a positive phase reactive fundamental current based on the output of the Fourier series expansion unit; and
a multiple frequency component removing unit which removes frequency components around a multiple of a system frequency from the positive phase active fundamental current, wherein:
the current instruction value calculating unit calculates the current compensation instruction value by subtracting the positive phase active fundamental current after the removal by the multiple frequency component removing unit and low-frequency fluctuation components of the positive phase reactive fundamental current from the load current.

6. The power converting device according to claim 1, further comprising:
a positive phase reactive fundamental current calculating unit which calculates a positive phase reactive fundamental current based on the output of the Fourier series expansion unit;
a negative phase Fourier series expansion unit which executes Fourier series expansion to a negative phase component of the detected load current;
a negative phase real axis fundamental current calculating unit which calculates a negative phase real axis fundamental current based on the output of the negative phase Fourier series expansion unit;
a negative phase imaginary axis fundamental current calculating unit which calculates a negative phase imaginary axis fundamental current based on the output of the negative phase Fourier series expansion unit; and
a multiple frequency component removing unit which removes frequency components around a multiple of a system frequency from the positive phase active fundamental current, wherein:
the current instruction value calculating unit calculates the current compensation instruction value by subtracting the positive phase active fundamental current after the removal by the multiple frequency component removing unit and low-frequency fluctuation components of the positive phase reactive fundamental current, the negative phase real axis fundamental current and the negative phase imaginary axis fundamental current from the load current.

7. The power converting device according to claim 1, further comprising a high-frequency fluctuation component removing unit which removes high-frequency fluctuation components from the positive phase active fundamental current, wherein:
the current instruction value calculating unit calculates the current compensation instruction value by subtracting the positive phase active fundamental current after the removal by the high-frequency fluctuation component removing unit from the load current.

8. The power converting device according to claim 1, further comprising:
a positive phase reactive fundamental current calculating unit which calculates a positive phase reactive fundamental current based on the output of the Fourier series expansion unit; and
a high-frequency fluctuation component removing unit which removes high-frequency fluctuation components from the positive phase active fundamental current, wherein:
the current instruction value calculating unit calculates the current compensation instruction value by subtracting the positive phase active fundamental current after the removal by the high-frequency fluctuation component removing unit and low-frequency fluctuation components of the positive phase reactive fundamental current from the load current.

9. The power converting device according to claim 1, further comprising:
a positive phase reactive fundamental current calculating unit which calculates a positive phase reactive fundamental current based on the output of the Fourier series expansion unit;
a negative phase Fourier series expansion unit which executes Fourier series expansion to a negative phase component of the detected load current;
a negative phase real axis fundamental current calculating unit which calculates a negative phase real axis fundamental current based on the output of the negative phase Fourier series expansion unit;
a negative phase imaginary axis fundamental current calculating unit which calculates a negative phase imaginary axis fundamental current based on the output of the negative phase Fourier series expansion unit; and
a high-frequency fluctuation component removing unit which removes high-frequency fluctuation components from the positive phase active fundamental current, wherein:
the current instruction value calculating unit calculates the current compensation instruction value by subtracting the positive phase active fundamental current after the removal by the high-frequency fluctuation component removing unit and low-frequency fluctuation components of the positive phase reactive fundamental current, the negative phase real axis fundamental current and the negative phase imaginary axis fundamental current from the load current.

10. The power converting device according to claim 1, further comprising a voltage compensation instruction value calculating unit which calculates a voltage compensation instruction value by executing Fourier series expansion to voltage detected at a connecting point, calculating a positive phase active fundamental voltage based on the result of the Fourier series expansion, subtracting the positive phase active fundamental voltage from system voltage, converting the difference into current by dividing the difference by impedance from a converter of the power converting device to the connecting point, and multiplying the obtained current by a real number, wherein:
the current instruction value calculating unit sets the current instruction value of the power converting device at the sum of the current compensation instruction value and the voltage compensation instruction value or at the sum of the current compensation instruction value, the voltage compensation instruction value and a current instruction value obtained by one or more other control units.

11. A power converting device which is connected in parallel with a fluctuating load, comprising:
a current detecting unit which detects system current;
a Fourier series expansion unit which executes Fourier series expansion to the detected system current;

a positive phase active fundamental current calculating unit (108) which calculates a positive phase active fundamental current based on the output of the Fourier series expansion unit; and a current instruction value calculating unit which calculates a current instruction value of the power converting device by calculating a current compensation instruction value by subtracting current obtained using at least the positive phase active fundamental current from the system current and setting the current instruction value at the current compensation instruction value or at the sum of the current compensation instruction value and a current instruction value obtained by one or more other control units.

12. A current control method for a power converting device which is connected in parallel with a fluctuating load, comprising:

a current detecting step of detecting load current;

a Fourier expansion step of executing Fourier series expansion to the detected load current;

a positive phase active fundamental current calculating step of calculating a positive phase active fundamental current based on the result of the Fourier expansion step; and a current instruction value calculating step of calculating a current instruction value of the power converting device by calculating a current compensation instruction value by subtracting current obtained using at least the positive phase active fundamental current from the load current and setting the current instruction value at the current compensation instruction value or at the sum of the current compensation instruction value and a current instruction value obtained by one or more other control steps.

13. The current control method according to claim 12, further comprising a positive phase reactive fundamental current calculating step of calculating a positive phase reactive fundamental current based on the result of the Fourier expansion step, wherein:

the current instruction value calculating step calculates the current compensation instruction value by subtracting the positive phase active fundamental current and low-frequency fluctuation components of the positive phase reactive fundamental current from the load current.

14. The current control method according to claim 12, further comprising:

a positive phase reactive fundamental current calculating step of calculating a positive phase reactive fundamental current based on the result of the Fourier expansion step;

a negative phase Fourier expansion step of executing Fourier series expansion to a negative phase component of the detected load current;

a negative phase real axis fundamental current calculating step of calculating a negative phase real axis fundamental current based on the result of the negative phase Fourier expansion step; and a negative phase imaginary axis fundamental current calculating step of calculates a negative phase imaginary axis fundamental current based on the result of the negative phase Fourier expansion step, wherein:

the current instruction value calculating step calculates the current compensation instruction value by subtracting the positive phase active fundamental current and low-frequency fluctuation components of the positive phase reactive fundamental current, the negative phase real axis fundamental current and the negative phase imaginary axis fundamental current from the load current.

15. The current control method according to claim 12, further comprising a multiple frequency component removing step of removing frequency components around a multiple of a system frequency from the positive phase active fundamental current, wherein:

the current instruction value calculating step calculates the current compensation instruction value by subtracting the positive phase active fundamental current after the removal by the multiple frequency component removing step from the load current.

16. The current control method according to claim 12, further comprising a positive phase reactive fundamental current calculating step of calculating a positive phase reactive fundamental current based on the result of the Fourier expansion step; and a multiple frequency component removing step of removing frequency components around a multiple of a system frequency from the positive phase active fundamental current, wherein:

the current instruction value calculating step calculates the current compensation instruction value by subtracting the positive phase active fundamental current after the removal by the multiple frequency component removing step and low-frequency fluctuation components of the positive phase reactive fundamental current from the load current.

17. The current control method according to claim 12, further comprising:

a positive phase reactive fundamental current calculating step of calculating a positive phase reactive fundamental current based on the result of the Fourier expansion step;

a negative phase Fourier expansion step of executing Fourier series expansion to a negative phase component of the detected load current;

a negative phase real axis fundamental current calculating step of calculating a negative phase real axis fundamental current based on the result of the negative phase Fourier expansion step;

a negative phase imaginary axis fundamental current calculating step of calculating a negative phase imaginary axis fundamental current based on the result of the negative phase Fourier expansion step; and a multiple frequency component removing step of removing frequency components around a multiple of a system frequency from the positive phase active fundamental current, wherein:

the current instruction value calculating step calculates the current compensation instruction value by subtracting the positive phase active fundamental current after the removal by the multiple frequency component removing step and low-frequency fluctuation components of the positive phase reactive fundamental current, the negative phase real axis fundamental current and the negative phase imaginary axis fundamental current from the load current.

18. The current control method according to claim 12, further comprising a high-frequency fluctuation component removing step of removing high-frequency fluctuation components from the positive phase active fundamental current, wherein:

the current instruction value calculating step calculates the current compensation instruction value by subtracting the positive phase active fundamental current after the removal by the high-frequency fluctuation component removing step from the load current.

19. The current control method according to claim 12, further comprising:

a positive phase reactive fundamental current calculating step of calculating a positive phase reactive fundamental current based on the result of the Fourier expansion step; and a high-frequency fluctuation component removing step of removing high-frequency fluctuation components from the positive phase active fundamental current, wherein:

the current instruction value calculating step calculates the current compensation instruction value by subtracting the positive phase active fundamental current after the removal by the high-frequency fluctuation component removing step and low-frequency fluctuation components of the positive phase reactive fundamental current from the load current.

20. The power converting device according to claim 1, wherein:

the current instruction value calculating unit calculates the current compensation instruction value by subtracting the positive phase active fundamental current from the load current.

21. The current control method according to claim 12, wherein:

the current instruction value calculating step calculates the current compensation instruction value by subtracting the positive phase active fundamental current from the load current.

* * * * *